Patented July 1, 1941

2,247,375

UNITED STATES PATENT OFFICE 2,247,375

TREATMENT OF BITUMINOUS MATERIALS

Arthur B. Hersberger, Philadelphia, Pa., assignor to The Atlantic Refining Company, Philadelphia, Pa., a corporation of Pennsylvania No Drawing. Application December 16, 1937,
Serial No. 180,141

2 Claims. (Cl. 196—22)

The present invention relates to the treatment of bituminous materials, and particularly bituminous materials such as cracked or uncracked petroleum residues.

A principal object of this invention is the treatment of bituminous residues for the production of asphalts having higher melting points than the residues employed as starting materials, without deleteriously affecting the other properties of the bitumen.

A further object of this invention is the production of bituminous materials having a low degree of susceptibility to temperature changes. That is, the consistency, as measured by the penetration, varies much less at different temperatures than does that of bituminous materials produced heretofore.

A further object of this invention is the treatment of residuums or asphalts produced by the cracking or non-cracking distillation of petroleum; residues from the hydrogenation of petroleum; heavy residual oils produced by polymerization; pitches or heavy tars derived from coal tar and asphaltic residues produced by the treatment of asphaltic petroleum oils with asphalt-precipitating agents.

In the production of asphalts of increased melting point, it has heretofore been customary to subject the asphaltic residual oils to fire and steam distillation for the removal of oil, or to subject the residual oils to oxidation by air, in the presence or absence of oxidation catalysts. In either case it is necessary to use large quantities of fuel and/or steam in order to produce asphaltic materials of the desired melting point, and, in many instances, particularly when air blowing, it is practically impossible to produce the desired melting point without affecting the other properties of the asphalt to an undesirable extent.

I have found that the melting point of bituminous residua, and particularly petroleum asphalts, may be increased in a relatively simple and inexpensive manner. In accordance with my invention, a heavy bituminous residue or asphalt is admixed with a halogenated organic compound at temperatures within the range of from about atmospheric to about 500° F., and the halogenated organic compound is thereafter substantially completely recovered from the treated bituminous material, no separation of any of the components of the asphalt being made. Such treatment effects a substantial increase in the melting point of the asphaltic material, and such increase may be of the order of from about 10° F. to about 200° F. or more, depending upon the temperature and duration of the treatment.

Among the various halogenated organic compounds which I may employ in accordance with my invention may be mentioned the mono- and polyhalogenated hydrocarbons such as methyl chloride, ethyl chloride, propyl chloride, butyl chloride, amyl chloride, ethylene dichloride, dichloro ethylene, trichloro ethylene, tetra chloroethane, carbon tetrachloride, chlorobenzene, chloronaphthalene, benzyl chloride and the like. The halogenated compounds may be employed in quantities varying from about 5% to about 500% by volume of the bituminous material to be treated. If the treatment is carried out at elevated pressures, or in the presence of a carrier or diluent, less than 5% of the halogenated compound may be employed.

In carrying out my process the bituminous material, which for convenience and not by way of limitation is referred to as asphalt, either in solid, semi-solid or molten state is admixed, preferably in a closed vessel, with a halogenated organic compound in such a manner that the halogenated compound is thoroughly disseminated through the asphalt. In instances where a relatively large proportion of the halogenated compound is employed, for example, from 100% to 500% by volume of the asphalt, the mixture may be quite fluid and constitute a substantially homogeneous solution. During the admixing of the halogenated compound with the asphalt, a sufficient superatmospheric pressure is preferably maintained in order to minimize loss of the halogenated compound by vaporization. After a thorough mixing of the halogenated compound and the asphalt is obtained, at either normal or elevated temperatures, which latter may be of the order of from 100° F. to 500° F., the mixture is then subjected to distillation for the removal and recovery of the halogenated compound. In general, the amount of halogenated compound recovered is upwards of 99% of that initially added to the asphalt. During the distillation step for the recovery of the halogenated compound the temperature required for the substantially complete removal of the halogenated compound is usually of the order of from 400° F. to 450° F. or higher, at atmospheric pressure. In some instances, particularly when relatively high boiling halogenated compounds are utilized, it is desirable to effect distillation under reduced pressure in order to prevent overheating of the treated asphalt. In any case, the above described treatment is carried on in the absence of artificially introduced air or other oxygen-containing gas, since the results produced by my treatment are in no wise dependent upon the presence of air, e. g., air blowing or artificial oxidation.

In one modification of my process, the treatment may be carried out employing preferably a relatively small proportion of a halogenated compound, i. e., from 5% to 20% by volume of the asphalt to be treated. In this case the asphalt and halogenated compound are heated and admixed in a closed vessel, under a superatmospheric pressure of the order of from 100 to 500 lbs./sq. in., and at temperatures of the order of from 200° F. to 400°F. After the mixing is completed, the pressure may be relieved and the halogenated compound permitted to vaporize or distill from the heated mixture. Smaller quantities of the halogenated compound may be employed, at either atmospheric or higher temperature and pressure, if a carrier or diluent such as gasoline, naphtha or benzol is used to thin out or increase the fluidity of the asphalt.

In a further modification of my process, asphalt, preferably rendered molten by heating, is brought into intimate contact with a vaporized halogenated organic compound, or such compound carried in an inert vaporous or gaseous medium such as nitrogen, carbon dioxide, flue gas or superheated steam. For example, a halogenated compound such as carbon tetrachloride may be vaporized and passed through a pool or series of pools of melted asphalt, or the carbon tetrachloride may be carried into contact with the heated asphalt by means of a stream of inert gas such as nitrogen or flue gas. Or, alternatively, heated asphalt may be sprayed or flowed downwardly through a tower in intimate countercurrent contact with vaporous carbon tetrachloride or an inert gas containing a substantial proportion of vaporized carbon tetrachloride. In all cases, the halogenated compound is finally separated from the treated asphalt and recovered substantially completely therefrom. While the exact mechanism of the change in the properties of bituminous materials produced in accordance with my process is not known, no separation of the constituents of the bituminous material is effected, i. e., no precipitation and separation of asphaltenes, resins or the like is brought about, and the halogenated organic compound is substantially completely recovered in the same condition as it was originally added. My process, which is carried on substantially in the absence of artificially-introduced air or oxygen, differs from the air blowing methods heretofore employed, and avoids the uncontrollable and deleterious effects of air oxidation.

My invention may be further illustrated by the following examples, wherein various asphaltic materials were warmed and admixed with carbon tetrachloride ($CCl_4$), and the $CCl_4$ then removed from the mixture by distillation. The percentage $CCl_4$ recovered, in all cases, was upward of 99% of that initially added to the asphalt, and the resulting treated asphaltic material was substantially 100% of that subjected to the treatment.

| Asphaltic material | Treatment | Melting point (B & R) | Penetration | | | Ductility 77° F. |
|---|---|---|---|---|---|---|
| | | | 32° F. | 77° F. | 115° F. | |
| | | °F. | | | | |
| Steam refined Venezuela 12 flux asphalt. | None | 108 | 21 | 92 | 332 | 100+ |
| Do | Admixed with 500% $CCl_4$ and $CCl_4$ then removed by distillation to 400° F. | 143 | 16 | 53 | 143 | 29 |
| Steam refined Venezuela 50/60 Pen. asphalt. | None | 134 | 18 | 50 | 165 | 110+ |
| Do | Admixed with 500% $CCl_4$ and $CCl_4$ then removed by distillation to 420° F. | 235 | 11 | 14 | 27 | 3 |
| Do | Admixed with 100% $CCl_4$ and $CCl_4$ then removed by distillation to 420° F. | 231 | 11 | 16 | 22 | 0 |
| Do | Admixed with 500% $CCl_4$ and $CCl_4$ then removed by distillation to 420° F. in presence of nitrogen gas. | 238 | 11 | 14 | 20 | 0 |
| Do | Admixed with 100% $CCl_4$ and $CCl_4$ then removed by vacuum distillation to 400° F. | 175 | 13 | 26 | 34 | 4 |
| Do | Admixed with 7% $CCl_4$ and heated in pressure vessel at 410° F. and 150 lb./sq. in. pressure for 1 hour. The $CCl_4$ was then removed by distillation to 400° F. | 343 | 1 | 4 | 8 | 0 |
| 160° F. melting point steam refined Venezuela asphalt. | Admixed with 500% $CCl_4$ and $CCl_4$ then removed by distillation to 400° F. | 343 | | | | |
| 190° F. melting point blown Venezuela asphalt. | Admixed with 500% $CCl_4$ and $CCl_4$ then removed by distillation to 400° F. | 292 | | | | |

In addition to producing asphaltic materials of higher melting point than the original asphalt, further advantages accrue from my process in that the asphalts produced have a lower temperature susceptibility, i. e., for a given penetration the asphalt treated in accordance with my process will have a higher melting point than an asphalt produced by air-blowing at elevated temperatures. Furthermore, the asphalts resulting from the treatment with a halogenated organic compound have a lower breaking temperature than blown asphalts of corresponding melting point. In general, the asphalts produced in accordance with my process are characterized in having breaking temperatures approximately 20° F. to 30° F. lower than those of blown asphalts of corresponding melting point. Asphalts having a very low breaking temperature for a given melting point are more elastic and less subject to fracture at low temperatures, and are therefore highly desirable in the manufacture of waterproof paints, coatings, roofing felts, shingles and the like. In the following examples the "Penetration index," which is a relationship between penetration at 77° F. and melting point, is employed as a measure of the temperature susceptibility of the asphalt, the higher the index value the lower is the temperature susceptibility, and the more valuable is the asphalt from the standpoint of small change in consistency with change in temperature. The determination and use of the "Penetration index" is fully described by J. Ph. Pheiffer and P. M. Van Doormaal in the Journal of the Institute of Petroleum Technologists, June 1936, page 414 et seq.

hydrocarbons, i. e., those containing one or more atoms of chlorine, bromine, or fluorine, but may include halogenated alcohols, aldehydes, acids, esters and ketones.

What I claim is:

1. The method of increasing the melting point of a material substantially solely of bituminous origin which comprises admixing said bituminous material with a halogenated organic compound,

| Asphaltic material | Treatment with halogenated organic compound | Melting point (B & R) | Penetration | | | Penetration index | Ductility 77° F. | Breaking temp. |
| --- | --- | --- | --- | --- | --- | --- | --- | --- |
| | | | 32° F. | 77° F. | 115° F. | | | |
| | | °F. | | | | | | °F. |
| 235° F. melting point Venezuela asphalt (air blown). | None | 235 | 3 | 8 | 15 | +3 | 0 | 75 |
| 50-60 penetration Venezuela asphalt (steam refined). | Admixed with 500% CCl₄ and CCl₄ then removed by distillation to 420° F. | 235 | 11 | 14 | 27 | +5 | 2¾ | 42 |
| 50-60 penetration Venezuela asphalt (steam refined). | None | 123 | 20 | 52 | 224 | +¼ | 110+ | Below 32 |
| 50-60 penetration Venezuela asphalt (steam refined). | Admixed with 100% of chloracetone and the latter removed by distillation to 400° F. | 213 | 9 | 17 | 30 | +4¼ | 2 | 50 |

It will be seen from the examples herein presented, that my process is applicable to a variety of bituminous or asphaltic materials, and affords a simple and economical method for effecting desirable changes in various properties of such materials. My process may be applied not only to petroleum residual oils, tars or asphalts produced by the cracking or non-cracking distillation of petroleum, but also to residual asphaltic materials from the destructive hydrogenation of petroleum, and asphaltic materials separated from petroleum by means of agents such as naphtha, liquefied normally gaseous hydrocarbons, i. e., butane, propane, ethane and the like or other precipitating agents.

Furthermore, the halogenated organic compounds which may be utilized in accordance with my invention are not limited to the halogenated heating said admixture to temperatures of from about 200° F. to about 400° F. under superatmospheric pressure in the absence of an artificially-introduced oxidizing gas, and thereafter removing said halogenated organic compound from said admixture by distillation at temperatures of from about 400° F. to about 450° F.

2. The method of increasing the melting point of a material substantially solely of bituminous origin which comprises admixing said bituminous material with a halogenated organic compound, heating said admixture to temperatures of from about 200° F. to about 400° F., under superatmospheric pressure in the absence of an artificially-introduced oxidizing gas, and thereafter removing said halogenated organic compound from said admixture by distillation.

ARTHUR B. HERSBERGER.